Dec. 2, 1969    C. L. E. MARCHERON    3,481,563
AIRCRAFT ARRESTING GEAR
Filed July 27, 1967    2 Sheets-Sheet 1
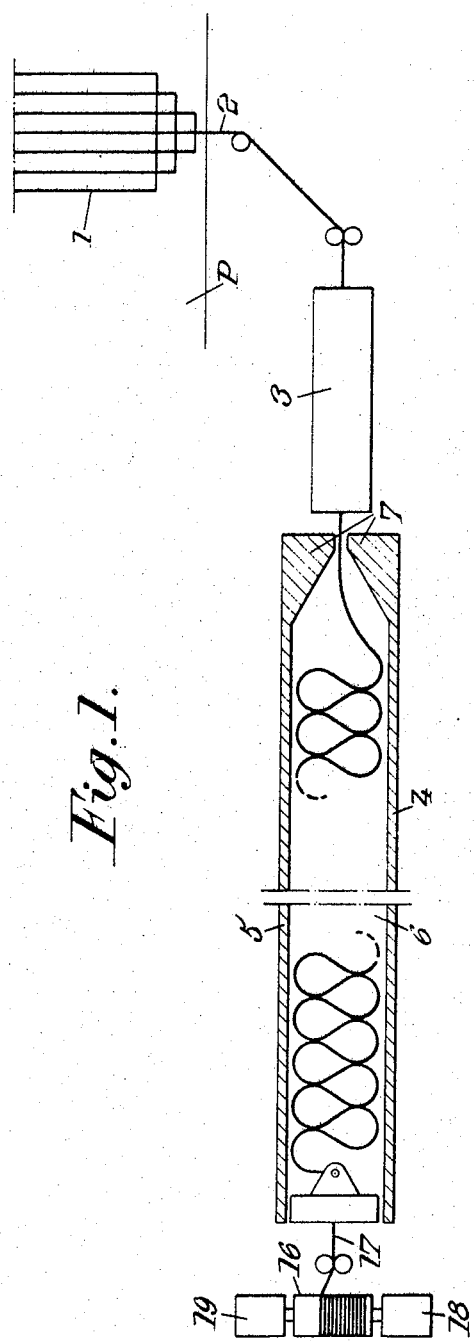
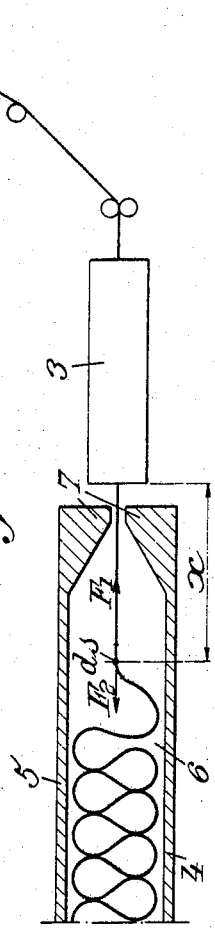

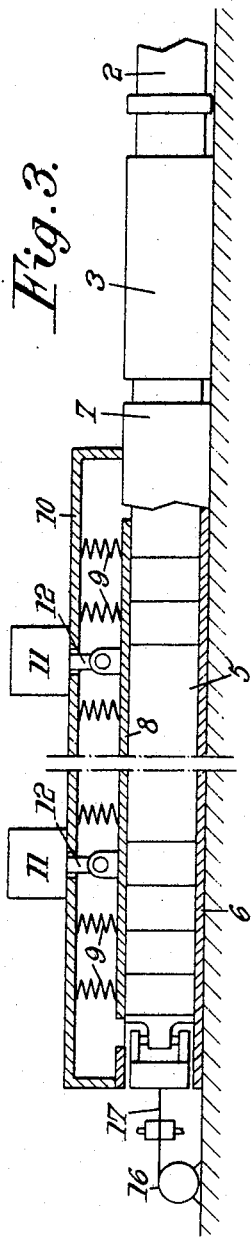
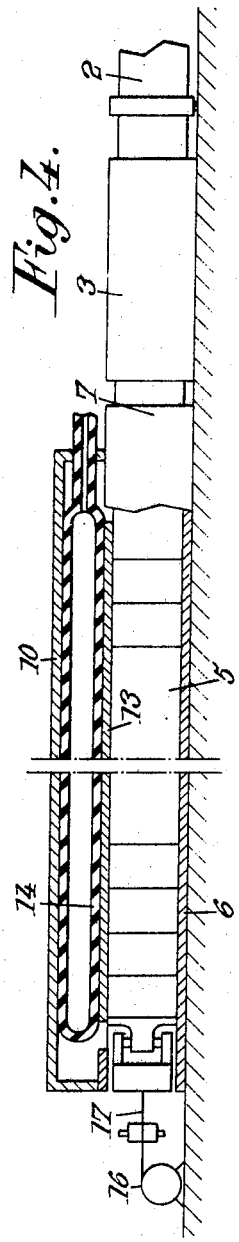
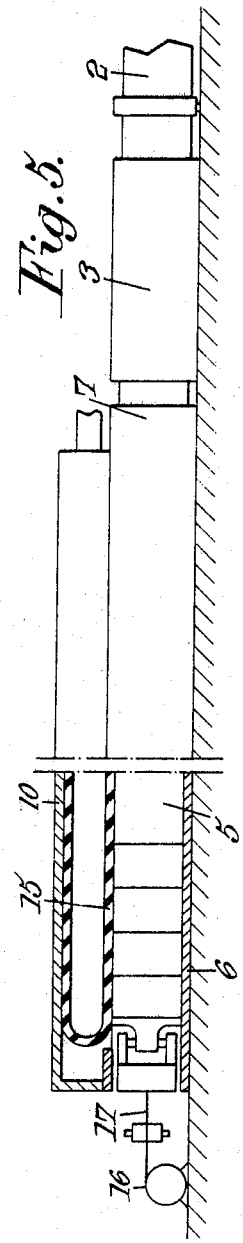

3,481,563
AIRCRAFT ARRESTING GEAR

Claude Louis Edouard Marcheron, Montrouge, France, assignor to Societe d'Exploitation des Materiels Hispano-Suiza, Bois-Colombes, France
Filed July 27, 1967, Ser. No. 656,389
Claims priority, application France, Aug. 11, 1966, 72,840, Patent 1,495,602
Int. Cl. B64f 1/02
U.S. Cl. 244—110                                    10 Claims

ABSTRACT OF THE DISCLOSURE

The arresting gear comprises an artificial obstacle to which are secured two holding straps. Each strap is subjected to the action of a braking device carried in fixed position. The strap is folded in a systematic manner upon a flat area located upstream of the braking device and it may be unfolded gradually before passing through said braking device. Special holding means are provided to exert upon a part of the portion of the strap located upstream of the braking device, an action tending to impede the unfolding and/or the movement of the strap toward the braking device.

---

The present invention relates to vehicle arresting gears comprising an artificial obstacle secured to at least one holding strap or band passing through a stationary braking device, nearly the whole of the portion of said strap located upstream of said braking device being folded in a regular fashion into a package bearing through one edge of the strap on a fixed rigid flat support and having to unfold gradually before passing through said braking device, this arresting gear artificial obstacle being more especially intended to be placed across a landing field runway to stop an aircraft running on said runway.

It is known that in an arresting gear of this kind the engaged the artificial obstacle because, otherwise, the strap would be damaged and possibly broken between the outlet of the braking device and the point where said strap is secured to the artificial obstacle.

In these conditions, the strap undergoes, after the aircraft has engaged the artificial obstacle, the action of pulling forces which may suddenly bring the strap in a disorderly fashion against the inlet of the braking device and, therefore, produce a tangling of the strap, which can no longer correctly enter the braking device.

The object of the present invention is to provide an arresting gear which is better adapted than those existing at the present time to meet the requirements of practice and which prevents such tanglings of the strap at the inlet of the braking device.

According to the essential feature of this invention, delaying means are provided for exerting on at least part of the strap folded portion an action for yieldingly opposing displacements of said strap toward said braking device.

Preferred embodiments of the present invention will be hereinafter described with reference to the appended drawings given merely by way of example and in which, FIG. 1 is a diagrammatic plan view from the top of an arresting gear according to the invention;

FIG. 2 is a smiliar view explaining the operation of the arresting gear of FIG. 1;

FIG. 3 is a longitudinal vertical section of an arresting gear according to a first embodiment of the invention; and FIGS. 4 and 5 are views, similar to FIG. 3, illustrating two other embodiments of the invention.

The artificial obstacle 1 may be made in any suitable manner consisting for instance of a cable or a net. When an aircraft engages said artificial obstacle 1, the latter drives at least one strap 2 fixed thereto. Generally, there are two such straps respectively connected to the ends of obstacle 1.

FIGS. 1 and 2 show only one of said two straps since the arresting gear is disposed symmetrically with respect to the airfield runway P.

Strap 2 is subjected to the action of a braking device 3 fixed with respect to the ground and consisting advantageously of a hydraulic apparatus.

Strap 2 is, in its upstream portion, folded into a package and its lower edge rests upon a flat surface so that it can unfold gradually before passing through braking device 3.

FIG. 2 shows the arresting gear just after an aircraft has engaged obstacle 1.

A length $x$ of the strap has already been unfolded.

A strap element $ds$ located at the end of the unfolded portion, just before the still folded portion of strap 2, is then subjected to the action of two momentums to wit, on the one hand, a momentum $F_1$ directed toward braking device 3, and on the other hand, a momentum $F_2$ opposed to $F_1$.

If $p$ designates the weight of the strap per unit of length, $V$ the velocity of the unfolded part of strap 2 and $\Delta V$ its decrease of velocity during time $\Delta T$, momentum $F_1$ will be equal to:

$$F_1 = p \cdot x \cdot \Delta V$$

and momentum $F_2$ will be equal to:

$$F_2 = p \cdot V \cdot \Delta T \cdot \Delta V$$

For practical purposes it is possible not to take into account the friction of strap 2 against supporting wall 6 and the force due to the rigidity of strap 2.

The condition for having the strap element in equilibrium is that momentum $F_2$ is always greater than, or equal to, momentum $F_1$, that is to say:

$$p \cdot V \cdot \Delta T \cdot V \geq p \cdot x \cdot \Delta V$$

that is to say if $\gamma$ is the mean negative acceleration $\Delta V / \Delta T$ during time $\Delta T$, $$x \leq V^2 / \gamma$$

Now, this negative acceleration is generally a constant the maximum admissible value of which averages $2g$, $g$ designating the gravity acceleration. $x$ varies from a practically zero value to a value $x_M$ equal to the length of the strap and $V$ varies from a maximum value $V_M$ depending upon the speed of which the aircraft strikes obstacle 1 to a zero value.

Therefore, after a certain time of operation, the above mentioned condition can no longer be complied with and, if no special precautions were taken, momentum $F_1$ would suddenly move the upstream portion of strap 2 toward the inlet of braking device 3.

According to the present invention, holding means are provided for exerting, upon a part of the upstream portion of strap 2, a continuous action which tends yieldingly to prevent the movement of strap 2 toward braking device 3.

It will be understood that during the operation of such an arresting gear, the risk of tangling strap 2 at the inlet of braking device 3 is eliminated.

For this purpose it is advantageous to use an arrangement such as illustrated by FIGS. 1 and 2, according to which the upstream portion of strap 2 is folded in zigzag fashion, with adjoining loops, between two side walls 4 and 5, the lower edge of the strap resting upon a rigid bottom 6.

There is provided, opposite the inlet of braking device 3, a guiding nozzle 7.

In these conditions the holding means comprise, in the embodiment of FIG. 3, at least one bearing plate 8 parallel to rigid bottom 6 and covering substantially all the upstream portion of strap 2, this bearing plate 8 being movable in a direction perpendicular to said rigid bottom 6; and at least one pressing means, such as a set of springs 9 interposed between bearing plate 8 and a fixed frame 10, capable, during operation of the arresting gear, of applying bearing plate 8 against the upper edge of strap 2.

Preferably there is provided, to prevent strap 2 from being acted upon by bearing plate 8 (in particular during the folding of the strap) at least one motor device 11 (mechanical, electrical, hydraulic, pneumatic or other device) the movable portion 12 of which is rigid with said bearing plate 8, said motor device 11 being arranged so that, when it is in operation, it moves bearing plate 8 upwardly against the action of springs 9; and when it is not in operation, it leaves bearing plate 8 applied by springs 9 against the upper edge of strap 2.

Instead of springs, use might be made of hydraulic, pneumatic or electric motor means for, on the one hand, keeping bearing plate 8 in contact with the strap upper edge when the arresting gear is in operation; and on the other hand, lifting bearing plate 8 from said strap when the latter is to be folded.

In the embodiment of FIG. 4 the holding means comprise, at least one bearing plate 13 parallel to rigid bottom 6 and covering practically all the upstream portion of strap 2, said bearing plate 13 being movable in a direction perpendicular to said rigid bottom 6; and at least one fluidtight bag 14, for instance made of rubber or an elastomer, interposed between bearing plate 13 and fixed frame 10, this bag 14 being connected with a source of fluid under pressure so that, when the arresting gear is working, bag 14 keeps bearing plate 13 applied against the upper edge of strap 2.

Preferably, this bag 14 is such that, when it is not subjected to the action of a fluid under pressure, its resiliency urges its lower part toward fixed frame 10. In these conditions, bearing plate 13 is glued and vulcanized to bag 14, so that strap 2 is no longer acted upon by said plate 13 as soon as bag 14 is no longer being inflated by fluid under pressure.

It would also be possible, according to a modification not shown by the drawings, to provide return means such as pulling helical springs interposed between bearing plate 13 and fixed frame 10 for urging said bearing plate upwardly.

Another embodiment is shown by FIG. 5.

In this embodiment the holding means still include a rubber bag 15 or the like but this bag is interposed directly between the upper edge of strap 2 and fixed frame 10.

This bag 15 extends approximately over the upstream portion of strap 2 and is in communication with a source of fluid under pressure (not shown) so that when the arresting gear is in operation, bag 15, inflated by said fluid under pressure, is applied against the upper edge of strap 2.

Preferably, this bag 15 is such that, when it is not subjected to the action of fluid under pressure, its own resiliency tends to retract it away from the upper edge of strap 2. Thus strap 2 is free from bag 15 (in particular for folding said strap 2) as long as bag 15 is not fed with fluid under pressure.

It should be pointed out, with reference to the construction of FIGS. 3, 4 and 5, that it is advantageous to divide the bearing plate and/or the fluidtight bag into several juxtaposed elements covering approximately the whole length of the portion of the strap that is folded.

It should be also noted that, when the holding means comprise, either hydraulic, pneumatic or electric jacks urging a bearing plate toward the upper edge of the strap; or a bag connected with a source of fluid under pressure and urging a bearing plate toward the upper edge of the strap; or again a bag connected with a source of fluid under pressure and directly urging the bag toward the upper edge of the strap; it is possible to vary the intensity with which such holding means tend yieldingly to oppose the unfolding and/or the movement of the strap toward the brake by acting upon the control of said jacks or upon the pressure delivered by the source of fluid.

In particular, in a construction that is not illustrated by the drawings, the controls of the jacks or the pressure delivered by the source of fluid may be made dependent upon one or several of the characteristics of the aircraft to be stopped (speed, weight, etc.).

It should be noted that the holding means, some embodiments of which have been described, oppose the unfolding of the strap but have but little effect upon the displacement of said strap when it is wholly unfolded.

This results from the fact that, when the strap is wholly unfolded, said holding means act only upon a small length of the upper edge of the strap.

When, as above stated by way of example, the strap is folded in zig-zag fashion with adjoining loops, the holding means act, when the strap is wholly unfolded, upon the upper edge of only one third or one quarter of the total length of the upstream portion of the strap.

Furthermore this strap, when wholly unfolded has a tendency to slant and is then no longer subjected to the action of the holding means as discussed above.

It is therefore advantageous to provide supplementary holding means to act in addition to the above mentioned holding means, said supplementary holding means acting directly upon the free end of the upstream portion of the strap so as resiliently to oppose the movement of the wholly unfolded strap toward the braking device.

According to the embodiments illustrated by FIGS. 1 and 3 to 5, said supplementary holding means comprise a winch 16 on which is wound a cable 17 secured to the free end of the upstream portion of strap 2. Said winch 16 is provided with a braking system 18 and, preferably, a motor 19 connected to said winch permits of rewinding cable 17 on winch 16 after strap 2 has been pulled toward braking device 3.

It would also be possible, according to a modification not illustrated by the drawings, to consitiute said supplementary holding means by one or several cables of resilient nylon (the relative elongation of which may reach 600%). One of the ends of this nylon cable would be secured to the free end of the upstream portion of the strap and the other end of the nylon cable would be anchored at a fixed point. In this case it would be necessary to replace this resilient nylon cable after every operation of the arresting gear.

In a general manner, while the above description discloses preferred embodiments of the invention, it should be well understood that it is not to be limited thereto as there might be changes made in the arrangement, disposition and form of the parts.

What I claim is:

1. An arresting gear for vehicles running on the ground which comprises, in combination, an artificial obstacle for said vehicles, a strap secured to one end of said obstacle, a braking device for said strap which passes through said braking device, said braking device being stationary with respect to the ground, most of the portion of said strap located upstream— with respect to the translation of the strap when said obstacle is displaced by the vehicle—of said braking device being folded in zig-zag fashion, a rigid support for one edge of said folded portion of said strap, and delaying means for exerting on at least part of the other edge of said strap folded portion a mechanical action yieldingly opposing the displacement thereof toward said braking device.

2. An arresting gear according to claim 1, wherein said rigid support is in the form of a plane wall against which said zig-zag folded portion of said strap is resting through said one edge thereof.

3. An arresting gear according to claim 2, wherein said delaying means comprise:
 at least one bearing plate parallel to said plane wall and movable with a translatory motion transversely to said plane wall so as to be able to bear upon the other edge of said strap,
 a fixed frame located on the other side of said strap from said rigid support, and
 pressing means between said fixed frame and said bearing plate for holding the latter applied against said other edge of said strap.

4. An arresting gear according to claim 3, wherein said pressing means are springs, further comprising motor means carried by said fixed frame and capable of moving said bearing plate away from said strap other edge against the action of said springs.

5. An arresting gear according to claim 2, wherein said delaying means comprise:
 at least one bearing plate parallel to said plane wall and movable with a translatory motion transversely to said plane wall so as to be able to bear upon the other edge of said strap,
 a fixed frame located on the other side of said strap from said rigid support, and
 a resilient fluidtight bag, adapted to be fed with fluid under pressure to inflate it, housed in the space between said fixed frame and said bearing plate for holding the latter applied against said other edge of said strap.

6. An arresting gear according to claim 5, wherein said fluidtight bag is secured to said bearing plate and has a resiliency that such when it is not inflated by means of a fluid, it tends to move said bearing plate away from said strap other edge.

7. An arresting gear according to claim 2, wherein said delaying means comprise:
 a fixed frame located on the other side of said strap from said rigid support,
 a resilient fluidtight bag adapted to be fed with fluid under pressure to inflate it, housed between said fixed frame and the other edge of said strap against which it bears directly when it is inflated.

8. An arresting gear according to claim 7, wherein said fluidtight bag has a resiliency such that when it is not inflated it tends to move away from said strap other edge.

9. An arresting gear according to claim 1, further including means for yieldingly pulling said strap at its upstream end in the direction opposed to the direction of movement of said strap toward said braking device.

10. An arresting gear according to claim 9, wherein said pulling means comprise a winch mounted on the ground, a cable wound on said winch and secured to the upstream end of said strap, and means for braking the rotation of said winch.

References Cited

UNITED STATES PATENTS

| | | | |
|---|---|---|---|
| 2,762,586 | 9/1956 | Van Zelm | 244—110 |
| 3,092,210 | 6/1963 | Ronnerstrom | 244—110 XR |
| 3,200,906 | 8/1965 | Bernard | 224—110 XR |
| 3,350,039 | 10/1967 | Crater | 244—110 |

FOREIGN PATENTS

| | | |
|---|---|---|
| 1,355,687 | 2/1964 | France. |

MILTON BUCHLER, Primary Examiner

PAUL E. SAUBERER, Assistant Examiner

U.S. Cl. X.R.

188—166